Norman H. Lehrer,
Richard D. Ketchpel,
INVENTORS.
BY.
W H MacAllister Jr.
ATTORNEY.

Sept. 26, 1967 N. H. LEHRER ETAL 3,344,300

FIELD SUSTAINED CONDUCTIVITY DEVICES WITH CDS BARRIER LAYER

Filed March 23, 1965 8 Sheets-Sheet 2

Norman H. Lehrer,
Richard D. Ketchpel,
INVENTORS.
BY.

W. H. MacAllister Jr

ATTORNEY.

Norman H. Lehrer,
Richard D. Ketchpel,
INVENTORS.
BY.

W. Hue McAllister Jr.

ATTORNEY.

Norman H. Lehrer,
Richard D. Ketchpel,
INVENTORS.
BY.
W. H. MacAllister Jr.
ATTORNEY.

Norman H. Lehrer,
Richard D. Ketchpel,
INVENTORS.
BY.
W. Hess Allister Jr
ATTORNEY.

Norman H. Lehrer,
Richard D. Ketchpel,
INVENTORS.
BY.
W. H. MacAllister Jr.
ATTORNEY.

Norman H. Lehrer,
Richard D. Ketchpel,
INVENTORS.
BY.
W. H. MacAllister Jr.
ATTORNEY.

INVENTORS.
RICHARD D. KETCHPEL,
NORMAN H. LEHRER,
BY
W. H. MacAllister, Jr.
ATTORNEY.

United States Patent Office 3,344,300

Patented Sept. 26, 1967

3,344,300

FIELD SUSTAINED CONDUCTIVITY DEVICES WITH CdS BARRIER LAYER

Norman H. Lehrer, Pacific Palisades, and Richard D. Ketchpel, Malibu, Calif., assignors to Hughes Aircraft Company, Culver City, Calif., a corporation of Delaware Filed Mar. 23, 1965, Ser. No. 442,049
18 Claims. (Cl. 313—92)

This invention relates to a solid state electrical device which exhibits the property of having different and sustained states of electrical conductivity. More particularly, the invention relates to a solid state thin film electrical element which is normally an electrical insulator but which under the influence of an applied electrical field has the ability to become electrically conductive in response to excitation by light or an electron beam and which substantially retains this increased electrical conductivity after such excitation has ceased for as long as the applied electrical field is maintained across the solid state element. This phenomenon is hereinafter referred to as "field sustained conductivity." Removal or reversal of the applied electrical field restores the solid state element to its normally insulating condition.

This phenomenon of field sustained conductivity has been previously observed and reported. Thus, F. H. Nicoll made use of the conductive memory effect in cadmium selenide powder in image storage devices and described the same in an article entitled "A Hysteresis Effect in Cadmium Selenide and Its Use in a Solid-State Image Storage Device," published in volume 19 of RCA Review in March of 1959 by RCA Laboratories, Princeton, New Jersey. Nicoll noted that the effect of a pulse of optical excitation was to trigger the conductivity from a low to a high value with both AC and DC fields. The voltage at which the triggering occurred depended on the incident light level. His field sustained conductivity element consisted of a mixture of cadmium selenide powder with a 1% plastic binder of ethyl cellulose which was applied between two transparent electrodes. He further reports that the dark current of his photo-conductor rose moderately at first but then at a critical voltage value (670 volts), the current jumped by about 3 orders of magnitude. When the voltage was lowered, the current decreased slowly until a second critical voltage was reached at which point the current dropped sharply to its original low value. While no explanation of this effect was offered, Nicoll did suggest its application to a solid state display device which would utilize the conductivity variations in the field sustained conductivity element to produce a modulation in the light output of an adjacent electroluminescent layer. It is important to note that the field sustained conductivity in Nicoll's work occurs in a powder, that the stored conductivity levels are only bistable (i.e., either off or on with no intermediate values or half-tones), and that excitation occurs only with light since the apparent thickness of the powder makes electron beam excitation impractical because of the extremely high beam energies that would be required.

Field sustained conductivity effects are also described in U.S. Patent No. 3,046,431 entitled "Storage Systems" by J. F. Nicholson. Nicholson's sustained conductivity material is in thin film form and utilization thereof is taught for the target for a vidicon-like camera tube. Nicholson describes his target as comprising two layers, one being a homogeneous mixture of arsenic and selenium which is deposited upon a substrate until a thickness of about 5 microns is obtained. The second layer is antimony trisulfide and is of about the same thickness as the arsenic and selenium layer. Nicholson reports that when this target is subjected to a light signal and then capped to prevent any further illumination, the expected instantaneous extinction of the image does not occur and the image can be retained anywhere from five minutes to an hour on the conventional television-type of scanning operation. Erasure of the stored signal is achieved by biasing the electron beam to cut-off or reducing the target voltage to zero for more than a few seconds. The erasure speed can be increased by uniformly illuminating the target with a high level light source.

It will be noted that Nicholson's target constitutes an evaporated film about 10 microns thick and that excitation is achieved with light only since the thickness of the film makes high speed electron beam excitation impractical because of the extremely high beam energies required to penetrate such a thick film. This difficulty can best be understood by considering the relationship between electron beam energy and penetration as given by the formula $$R=.0015\ E^{1.35}$$

where R is the range in milligrams/cm.$^2$ and E is the beam energy in kilovolts. Assuming a 10 kv. beam as the maximum practical value, then $$R=(.0015)(10^{1.35})=(.0015)(22.4)=257\times10^{-6}\ \text{g./cm.}^2$$

The film penetration, $X_0$, can be obtained from the following:

$$R=\rho X_0$$

where $\rho$ is the density of the film and in the case of arsenic trisulfide $\rho=4$ gms./cc., hence:

$$X_0=\frac{R}{\rho}=\frac{257\times10^{-6}}{4}\ \text{cm.}=64\times10^{-6}\ \text{cm.}=0.64\ \text{micron}$$

$$X_0=0.64\ \text{micron}$$

From the foregoing, it will be seen that a 10 kv. beam penetrates only about 6% of the film thickness and therefore produces little change in the conductivity of the material. To write on such a storage target at practical values of the beam energy, the target thickness thus should not exceed about one to two microns. Reducing the thickness of Nichlson's storage target, however, to about one micron would not appear to result in a useful target structure since his data suggests that at fields greater than $10^4$ volts/cm., the dark leakage current increases sufficiently to obscure the current induced by the signals.

Thus in the case of a one-micron-thick target, operation would be limited to about one volt, which is too low to lent itself to practical electron beam readout of the modulations in the field produced by the optical input.

It is an object of the present invention to provide an improved field sustained conductivity device and material which can be fabricated in the form of a thin film, which can store electrical charges at a plurality of conductivity levels, which can integrate successive excitations, which can withstand thermal processing at 300°–400° C. in vacuum, which can be subjected to fields of $10^5$ volts cm. without breaking down, and which can be excited with either light or electron beams or both. The ability of the field sustained conductivity structure of the present invention to withstand a field of $10^5$ volts cm. without breaking down means that a film one micron thick can be operated at 10 volts. Hence the field sustained conductivity structure of the present invention can be made thin enough to be written on with an electron beam while still being operable at sufficiently high voltages to be read out by an electron beam.

Another object of the present invention is to provide an improved direct-viewing storage tube.

Another object of the invention is to provide an improved meshless direct-viewing storage tube.

Yet another object of the invention is to provide an improved meshless direct-viewing storage tube of high resolution and contrast.

Still another object of the invention is to provide an improved meshless direct-viewing storage tube in which the storage function is achieved by means of sustained bombardment induced conductivity.

Figure 1:
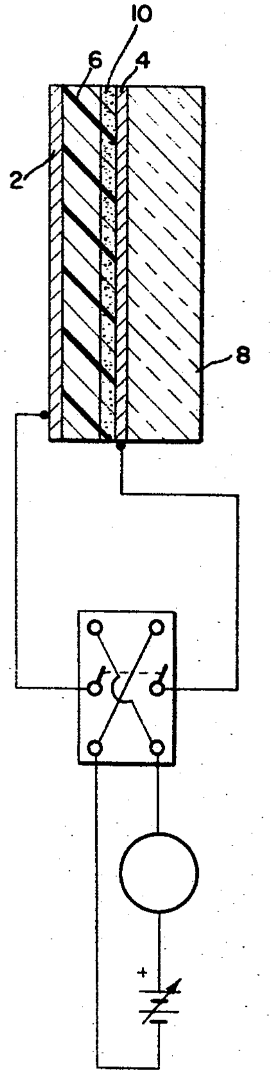
FIGURE 1 is a schematic drawing of a field sustained conductivity device according to the present invention.

Referring now to the drawings and to FIGURE 1 in particular, a field sustained conductivity device is shown consisting essentially of two electrodes 2 and 4 in contact with the opposing faces of thin film 6 of cadmium sulfide dielectric. It will be understood that because of the thin film nature of the device, a supporting substrate 8 such as glass is provided. For convenience hereinafter the electrode 4 which contacts the substrate 8 will be called the lower or bottom electrode; and the electrode on the exposed face of the dielectric 6 will be called the top electrode. Adjacent to either of the electrodes, a barrier region 10 exists in the bulk cadmium sulfide dielectric. It has been found that the electrical characteristics of field sustained conductivity layers and devices according to the present invention critically depend upon the formation of this thin barrier region. These characteristics include the ability to increase in conductivity as a result of excitation with light or electron beams, to store these conductivity changes, to integrate successive excitations and to return to the nonconducting state as a result of a momentary reversal or removal of the field applied across the dielectric. While the precise nature of the barrier region is not fully understood, its formation will be described in detail herein. It will also be understood that the barrier region 10 may be formed either adjacent the top or bottom electrodes 2 or 4, respectively.

The fabrication of a field sustained conductivity device according to the invention may be classified into four basic processing steps: (1) evaporation of the bottom electrode 4 onto the substrate 8; (2) evaporation of the dielectric layer onto the bottom electrode 4; (3) thermal processing to form the barrier if the barrier 10 is to be formed adjacent the bottom electrode 4; (4) deposition of the top electrode 2. If the barrier region 10 is to be formed adjacent the top electrode 2, the thermal processing of step 3, supra, is performed again after the top electrode has been deposited. Following this outline the fabrication of a field sustained conductivity device will now be described. It will be understood that many variations in the process are available and that dimensions and shape are exemplary only.

The substrate member 8 may comprise a glass slide which is utilized because of its smooth surface, ready availability in convenient size and because of its electrical insulating properties. Care is used in preparing the glass substrate 8 for use in the field sustained conductivity device of the invention. It has been found that superior device results are obtained when utilizing a glass slide which is first rinsed in deionized water and then scrubbed with precipitated chalk (calcium carbonate) on a piece of cotton. Thereafter the slide is given successive rinses with deionized water, diluted nitric acid and deionized water. It is then spun dried in a centrifuge and stored in a heated cabinet until ready for the next processing step which is the formation of the bottom electrode 4.

In a typical embodiment, a glass slide 2" x 3" x 1/16" was used for the substrate member 8, and by known masking techniques the bottom electrode 4 was formed thereon in the shape of a 1" x 2" rectangle. The material comprising the bottom electrode 4 is aluminum and it is applied onto the substrate by means of vapor deposition techniques which are known in the art. In a typical example, pure aluminum wire having a diameter of 1/16" is formed into a flat coil about six inches in length and laid on top of a tungsten filament which is about 1" in diameter. The tungsten filament comprises a coil of three strands of tungsten wire each 1/32" in diameter which is cleaned in a potassium hydroxide electrolytic solution, and then rinsed in deionized water and dried in acetone prior to use in the evaporator. The flat aluminum coil may also be cleaned in acetone prior to being mounted on the tungsten filament. The substrate is arranged to be about 13 inches from the aluminum coil and then the evaporator is pumped down to about 0.01 micron before evaporation starts. The aluminum is evaporated to completion and, in following the foregoing procedure, a film of aluminum about 5,000 angstroms thick is formed. It will be appreciated that the formation of the bottom electrode is not especially critical. If an optically transparent bottom electrode is desired, then it can be made only a few hundred angstroms thick.

The next step is the evaporation of cadmium sulfide dielectric over the bottom electrode. In accordance with the dimensions of the example described so far, the dielectric coating is formed in the shape of a rectangle about 1½" x 1¾" so as to overlap the bottom aluminum electrode 4 on three sides, with the fourth side of the bottom electrode being exposed for a distance of about 5/16" for electrical contact purposes. In evaporating the cadmium sulfide, no significant difference has been found when the evaporation was accomplished with and without the bottom electrode having been exposed to the atmosphere before the CdS is deposited. It would appear that the cadmium sulfide layer is not acutely affected by small amounts of impurities present in the cadmium sulfide source which is used for evaporation. The cadmium sulfide employed is of electronics grade purity and is manufactured and sold by the General Electric Company, Chemical Products Plant, Cleveland, Ohio.

A convenient technique for evaporating the cadmium sulfide is to utilize a tantalum boat about 3" long, 1"

wide and 0.002" thick folded lengthwise with the ends welded together to yield a canoe-shaped evaporator.

The quantity of cadmium sulfide loaded into the evaporator boat will be determined by the ultimate film thickness desired to be formed. It has been noted in experiments conducted to date that about 3.2 grams of cadmium sulfide produces an evaporated film about 1.9 microns thick. Close monitoring of the temperature of the tantalum boat is necessary to control the rate of evaporation.

In practice, the evaporator apparatus is evacuated down to about 0.01 micron with a liquid nitrogen cold trap and the temperature of the tantalum boat is slowly raised to about 800° C. in one hour. In general, it has been found convenient to manually control the rate of temperature increase by observing pressure changes within the evaporator and the behavior of the dielectric in the boat. Thus, if the temperature is increased too rapidly, some of the cadmium sulfide material will jump from the boat or the pressure in the evaporator will increase excessively. The tantalum boat is preferably covered with a glass shutter which can be manually controlled from the outside of the evaporator until the temperature reaches 800° C. Thereafter the shutter is moved aside and during the next 90 minutes the temperature is uniformly raised to about 950° C. and evaporation is continued until very little if any residue is left in the boat.

In this manner, a thin film of cadmium sulfide dielectric is formed on the bottom electrode 4. As noted hereinbefore, if the barrier layer in the cadmium sulfied dielectric is to be formed adjacent the bottom electrode, the next step would be the necessary thermal processing to form this barrier. If, on the other hand, the barrier layer is to be formed adjacent the top electrode, a second thermal processing takes place after the top electrode 2 has been formed. Since in FIGURE 1 the barrier layer 10 is shown adjacent the bottom electrode, its formation will be described at this point.

While the precise nature of the barrier region 10 is not understood, it appear that the thermal processing to be described hereinafter promotes a reaction between the aluminum and cadmium sulfide in the presence of a sulfur-containing atmosphere such as hydrogen sulfide that results in the formation of a thin region of very high resistivity material which is termed the barrier layer herein. While, in the following, to form this barrier region the use of hydrogen sulfide is taught, investigations have also disclosed that sulfur dioxide may be used in place of hydrogen sulfide. With special reference to FIGURE 2, the thermal processing of the cadmium sulfide films 6 on the glass substrates 8 is accomplished in a quartz furnace tube 12. Provision is made for flushing the system with dry nitrogen at a pressure of several pounds per square inch before starting the thermal processing. Before entering the quartz furnace tube 12, the hydrogen sulfide is passed through a dry chamber 14 containing phosphorous pentoxide. The hydrogen sulfide itself is supplied from a standard cylinder 16 and the pressure is adjusted to be approximately 5 pounds per square inch. By means of a flow meter 18 the hydrogen sulfide is caused to flow at a rate of about 10 cubic centimeters per minute. The quartz furnace tube 12 is heated by the furnace 20.

Figure 2:
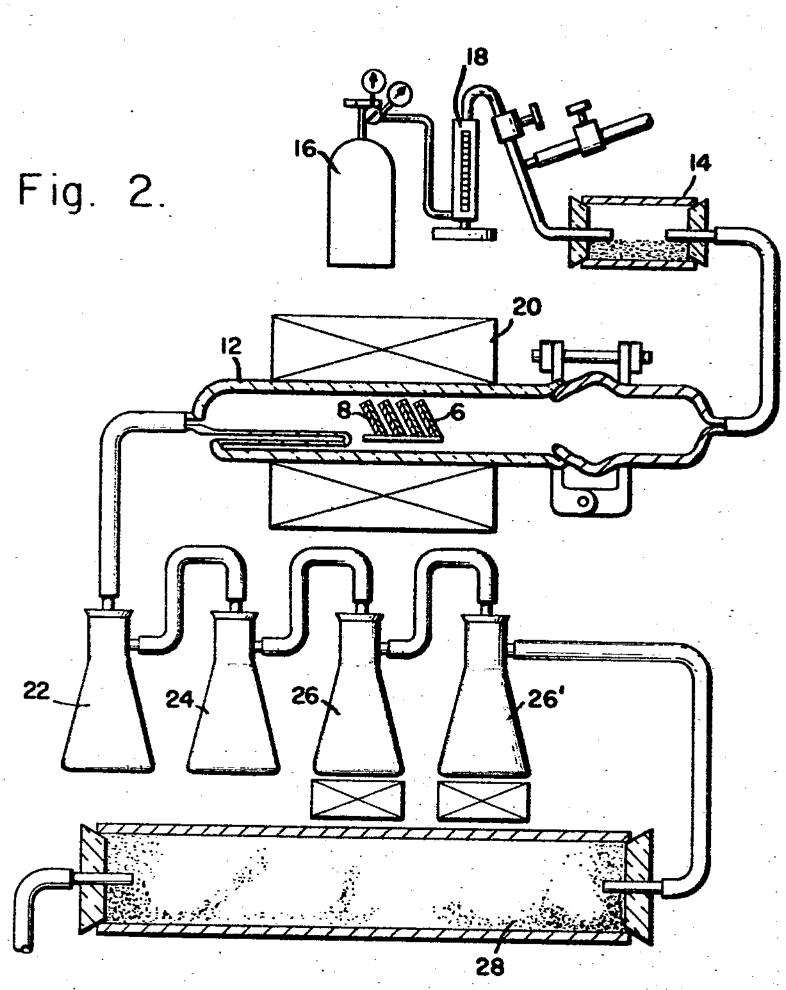
FIGURE 2 represents apparatus used to carry out the process for forming the field sustained conductivity elements of the invention.

It has been found important to place the cadmium sulfide-coated glass slides in the quartz furnace tube 12 with the coated side of the substrate members 8 facing the flow of hydrogen sulfide vapor. Also it is necessary to prevent backing up of the hydrogen sulfide and this is achieved by means of a check valve 22 for the hydrogen sulfide after it leaves the quartz furnace tube 12. After leaving the check valve, the hydrogen sulfide enters a buffer 24, the purpose of which is to smooth any sudden surges in pressure caused by any abrupt changes in the flow rate. The remaining equipment shown in FIGURE 2 is provided from the standpoint of both comfort and safety since it is important that no hydrogen sulfide escape into the air. Such escape is prevented by means of the scrubbers 26 and 26' which cause the hydrogen sulfide to react chemically and final absorption of the hydrogen sulfide is achieved by means of the activated charcoal filter 28 after which it is exhausted outdoors.

The cadmium sulfide-coated slides are thoroughly heated in the furnace at an appropriate temperature and time, the parameters of which are described hereinafter. After thermal processing is completed, the sulfide-coated slides are allowed to cool before being removed from the furnace and care should be exercised to prevent exposure to excessive humidity. Where the barrier region 10 is to be formed adjacent the bottom electrode 4, the top electrode can be made from any of several materials including aluminum, platinum, tin oxide, gold, indium, palladium and rhodium. It will be appreciated, however, that the electrode which is to be adjacent the barrier region must be of aluminum according to the present invention. In the device shown in FIGURE 1, since the barrier region 10 is adjacent the bottom electrode 4, a choice of materials exists for the top electrode 2 subject to certain precautions, however. If the ultimate structure is to be reheated at temperatures in excess of 100° C. as in the case of electron tube fabrication, then the top electrode material must be selected with some consideration. Materials such as gold and indium tend to diffuse through the cadmium sulfide layer 6 at temperatures in excess of 100° C. and can cause electrical shorting of the dielectric layers 6. On one hand, materials such as aluminum and platinum do not cause such shorting. On the other hand, gold or indium top electrodes produce field sustained conductivity devices which exhibit greater forward currents (i.e., higher rectification ratios) than aluminum or platinum. However, equal excitation generally causes the same stored change in conductivity no matter what material is utilized for the top electrode.

Since the field sustained conductivity device of the present invention will find many applications in cathode ray tubes and will therefore be subject to excitation by electron bombardment, the field sustained conductivity target must be reheated to a temperature of at least 400° C. in vacuum during tube fabrication. To satisfy these fabrication conditions, aluminum is a preferred material for the top electrode because an aluminum electrode can be fabricated thin enough to be nearly transparent to high energy electrons and still retain high conductivity.

Figure 3:
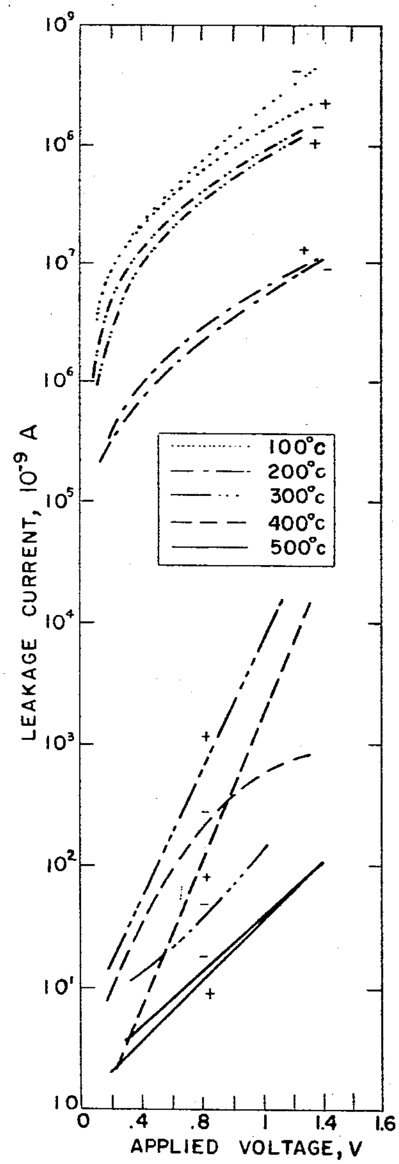
FIGURE 3 is a graph illustrating the dependence of the volt-ampere characteristic of devices according to the invention on the thermal processing temperature employed during the fabrication thereof.

As noted previously, the time and temperature of thermal processing are critical in forming the barrier layer 10 in the cadmium sulfide material. Since for storage devices it is desired to produce a field sustained conductivity device which will exhibit maximum sustained increases in conductivity after excitation has ceased, the effect of variations in thermal processing time and temperature was studied and compared with the volt-ampere characteristics of the field sustained conductivity layers of the present invention, since in this case strong rectification effects correlate rather well with pronounced conductive memory effects. Six groups of field sustained conductivity devices were fabricated in an identical fashion except for the processing temperature. The processing time was two hours for each of the six groups. With reference to FIGURE 3, it will be noted that five of the six groups were processed respectively at temperatures of 100° C., 200° C., 300° C., 400° C. and 500° C. The sixth group that constituted the control was not processed. Each element on every sample was checked at −1 v. and +1 v. When all or most of the leakage currents were within several percent of each other, the volt-ampere characteristic taken on one element was used for comparison. When there were substantial differences between the elements, a graph was produced to represent an average of the various characteristics.

The volt-ampere characteristics for the six groups of samples are compared in FIGURE 3. It should be noted that the desired characteristic is a high forward to reverse ratio, which indicates good rectification. It should also be observed that the samples of the control group, which received no processing at all, have almost identical curves for the forward and reverse direction, have high leakage currents and no memory effect. It may also be observed that processing at 100° C. for two hours did not significantly change the rectification characteristics although the leakage current did increase slightly. At 200° C. the thermal processing begins to show some effect. Although the forward and reverse currents are still about equal as in the case of 100° C. processing, the absolute value of the current is down by a factor of ten from that of the control group. Processing at 300° C. resulted in a substantial effect. Thus when 1.5 v. are applied to the cadmium sulfide layer, the rectification ratio is about 100:1 and the forward current is down about four orders of magnitude from that of the control group. Processing at 400° C. produces a further reduction in the forward current from that of 300° C. samples. Note, however, that rectification effects are reduced by processing and that the reverse current at 400° C. is now greater than that of the 300° C. processed samples. At 500° C. the forward current is further reduced so that it is down about six orders of magnitude from that of the control group. However, the samples processed at this temperature did not exhibit rectification. It thus appears that thermal processing at a temperature of about 300° C. for two hours is an optimum procedure for producing layers with high rectification ratios and hence good memory effects, although it is obvious from the foregoing data that the precise temperature is not critical as far as producing operable field sustained conductivity devices.

Figure 4:
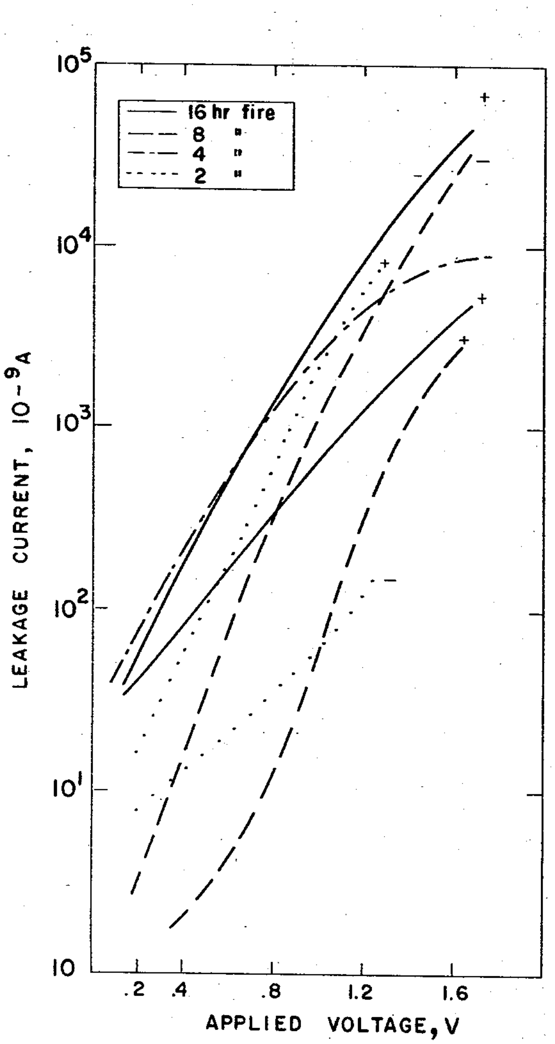
FIGURE 4 is a graph illustrating the dependence of the volt-ampere characteristic of devices according to the invention on the thermal processing time employed during the fabrication thereof.

Investigations were also undertaken to determine the optimum time for processing the field sustained conductivity device of the invention at the optimum temperature of 300° C. Four groups of samples were each fired respectively for four different periods of time. The measurement procedure was substantially the same as that used in investigating the temperature effect on the layer characteristics described previously. The characteristic volt-ampere curves for each of the four groups are plotted in FIGURE 4. As noted previously, the samples fired for two hours exhibited good rectification effects with the forward current almost two orders of magnitude greater than the reverse current when 1 v. is applied to the cadmium sulfide layer. Processing at 300° C. for four hours does not appear to substantially affect the forward characteristic but the reverse current was substantially increased so that the samples of this group did not rectify to any appreciable extent. For the sample groups that were fired 8 and 16 hours, the reverse current actually became greater than the forward current. In other words, for these samples the rectifying characteristic actually reversed and the samples did not exhibit any memory effect with any polarity.

From the foregoing processing data, it would appear that the preferred schedule from the fabrication of cadmium sulfide layers having a thickness of 0.5 micron and operating at 1.5 v. is heating at 300° C. for two hours. It has also been noted that $SO_2$ may be employed in place of $H_2S$. It is also possible to increase the operating voltage to 5 v. for a ½ micron thick layer by using the preceding procedures to form successive dielectric layers of cadmium sulfide each about ¼ micron in thickness.

The foregoing procedure is that which is utilized to form a barrier region adjacent the bottom electrode. In order to form a barrier region adjacent the top electrode 2, a material is selected for the bottom electrode which does not react with the cadmium sulfide. Platinum is an outstanding example of a suitable material for this purpose. Likewise in this instance the thickness of the bottom electrode is not critical and it has been found that a film sufficiently thick to be opaque usually has the desired conductivity. The techniques employed for deposition of the platinum are well known and are described in "Vacuum Deposition of Thin Films" by L. Holland (John Wiley & Sons, Inc., New York, 1958, with special reference to chapter 14 thereof).

After the non-reactive bottom electrode has been formed, the bulk cadmium sulfide dielectric is deposited over the bottom electrode as described previously. The layer is then thermally processed as in the case of forming the barrier adjacent to the bottom electrode. Thereafter the top aluminum electrode is deposited which is evaporated to about 500 A. or greater. The final step is to again thermal process the device as described previously in order to form the barrier region adjacent to the top electrode. With special reference again to FIGURE 1, the field sustained conductivity devices of the present invention have an asymmetrical volt-ampere characteristic such as typically exhibited by diodes. The current through the dielectric is orders of magnitude less when the electrode adjacent to the barrier region is at a lower potential than the other electrode. This is the reverse bias condition. The sustained currents occur in this reversed bias state. When excited, as by illumination, the effect is to increase the conductivity of the cadmium sulfide layer, which conductivity increase is maintained after excitation ceases. The devices of the present invention can be restored to the low conductivity state after excitation has ceased by momentarily interrupting or reversing the applied field.

Figure 6:
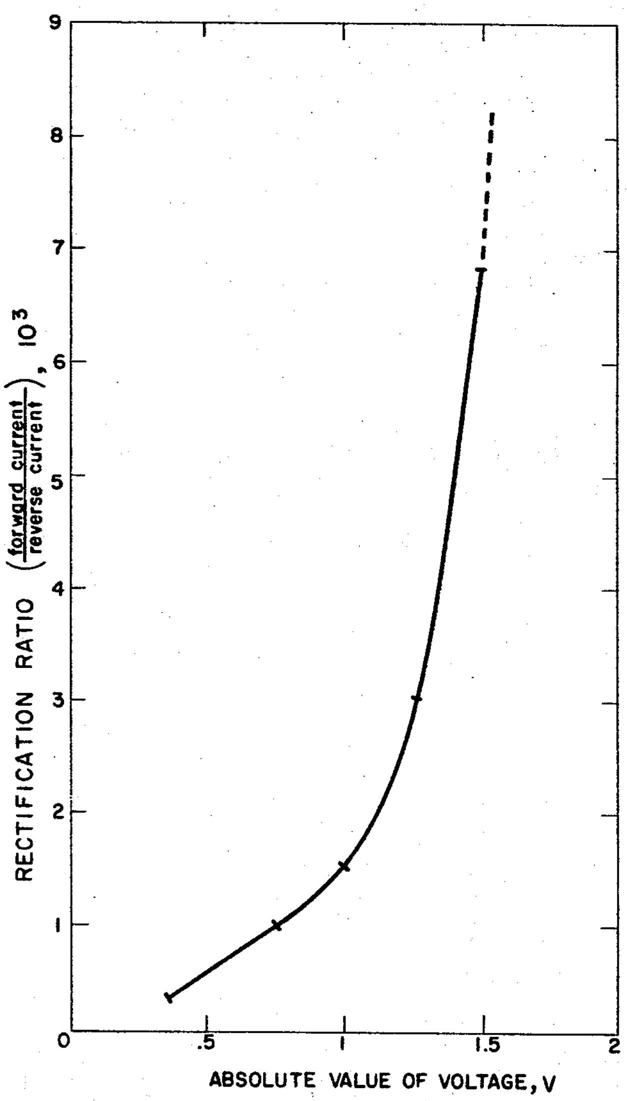
FIGURE 6 is a graph illustrating the rectification ratio versus the applied voltage of a field sustained conductivity structure according to the invention.
Figure 5:
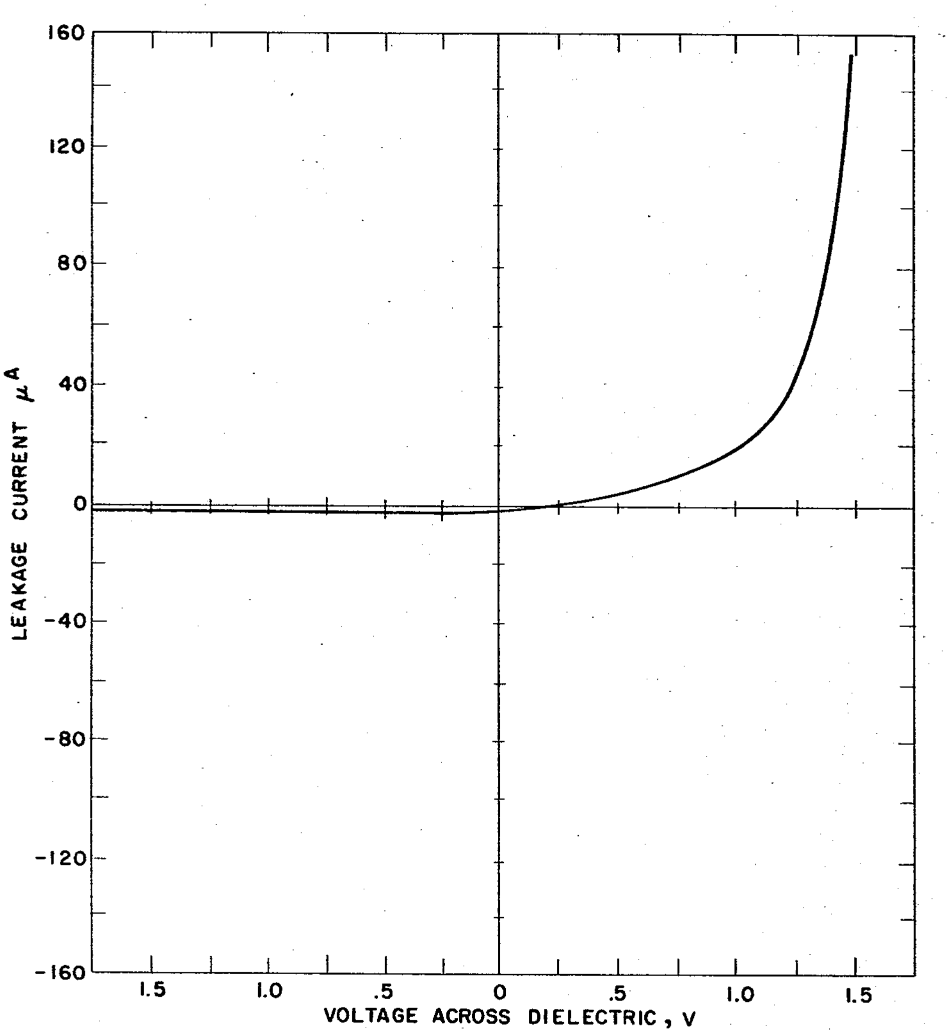
FIGURE 5 is a graph illustrating a typical volt-ampere curve of a field sustained conductivity structure according to the invention wherein the barrier region is formed adjacent the bottom electrode.

FIGURE 5 is a typical volt-ampere characteristic of a field sustained conductivity structure such as shown in FIGURE 1 wherein the barrier is formed adjacent to the bottom electrode. Hence, the current through the dielectric layer is orders of magnitude less when the applied voltage is negative (i.e., when the bottom electrode 4 is at a lower potential than the top electrode 2). As mentioned previously, the dielectric layer 6 including the barrier region 10 is about a half micron thick in the device shown in FIGURE 1. The rectification ratio of such a device is shown in FIGURE 6. The rectification ratio is the current at a particular positive value of the applied voltage divided by the current at the corresponding negative value of that voltage. In this case, the maximum rectification ratio is about 7,000. When the DC voltage across the layer exceeds about −1.5 v., irreversible breakdown occurs and the result of this breakdown is to increase the leakage current in the reverse direction to such an extent that the volt-ampere characteristic becomes symmetrical and the memory characteristic is destroyed.

Figure 7:
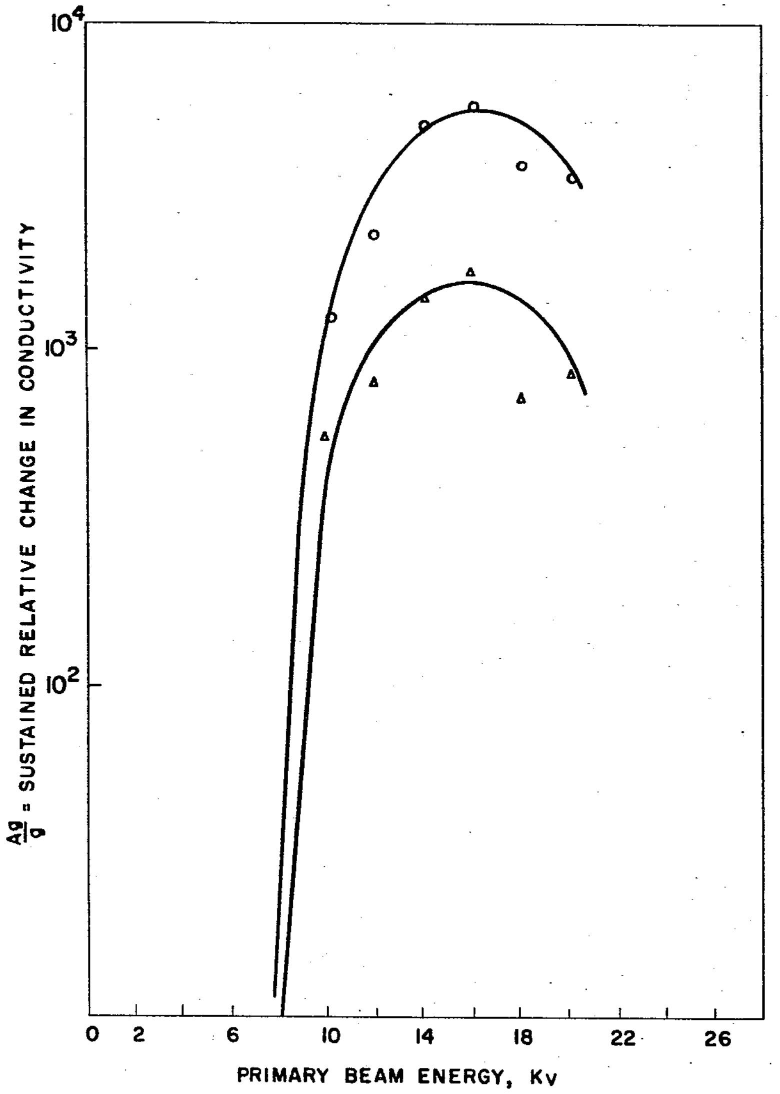
FIGURE 7 is a graph illustrating the relative sustained change in conductance versus the primary beam energy on a field sustained conductivity structure according to the invention.

In FIGURE 7, the effect of electron beam excitation on the conductivity in the half-micron-thick field sustained conductivity structure of FIGURE 1 is shown. The curves plotted in FIGURE 7 represent the ratio of changes in conductivity resulting from excitation by the electron beam to the pre-excited conductivity of bombarded region. The upper curve A in FIGURE 7 shows the change in conductivity immediately following bombardment during a ten-second period with 600 pulses, each of which was 150 microseconds in duration and 1 microamp in current. The lower curve B represents the change in conductivity 5 seconds after bombardment has ceased. It will thus be noted that the maximum change in conductivity obtained as a result of this excitation is almost four orders of magnitude greater than the prebombardment conductivity. Further, inasmuch as the barrier region 10 is adjacent to the bottom electrode 4, no significant conductive memory effects occur until the electron beam penetrates the dielectric layer 6 to reach the barrier layer 10 which happens at a beam energy of about 8 kv. These mesurements were made with about 1.5 v. applied to the dielectric layer 6. The greatest sustained relative change in conductivity occurs at the maximum value of the applied voltage before breakdown, which voltage also happens to be that at which the maximum rectification ratio occurs.

Figure 8:
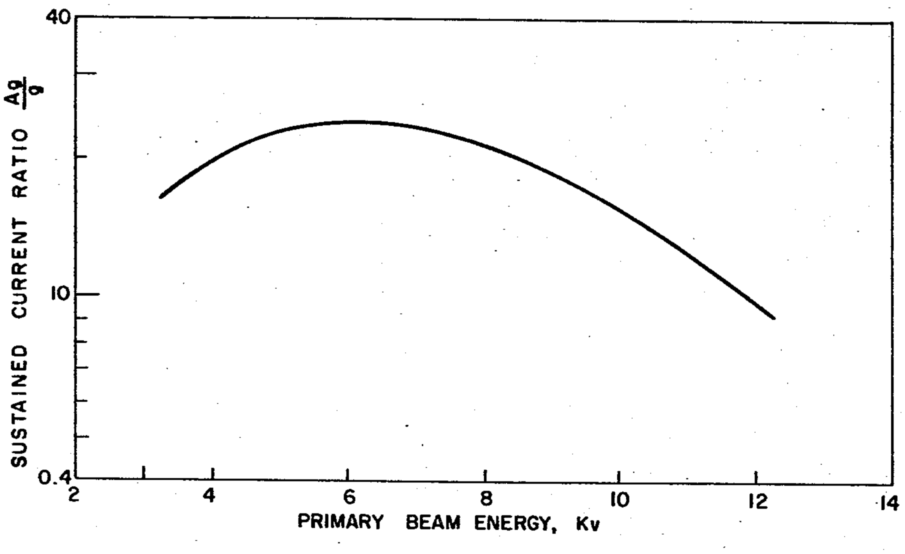
FIGURE 8 is a graph illustrating the relative sustained change in conductance versus the primary beam energy for a field sustained conductivity structure according to the invention with the barrier at the upper electrode.

When the barrier region 10 is formed adjacent the top electrode 2, the effect of electron beam excitation is shown in FIGURE 8. Since in this case the dielectric layer 6 is about ½ micron thick, the electron beam encounters the barrier 10 almost immediately upon entering the film so that strong conductivity memory effects occur at much lower values of the beam energy than when the beam is formed adjacent to the bottom electrode 4. As beam energy increases, less and less energy is absorbed in the region of the barrier 10 and the sustained relative change in conductance decreases.

Figure 9:
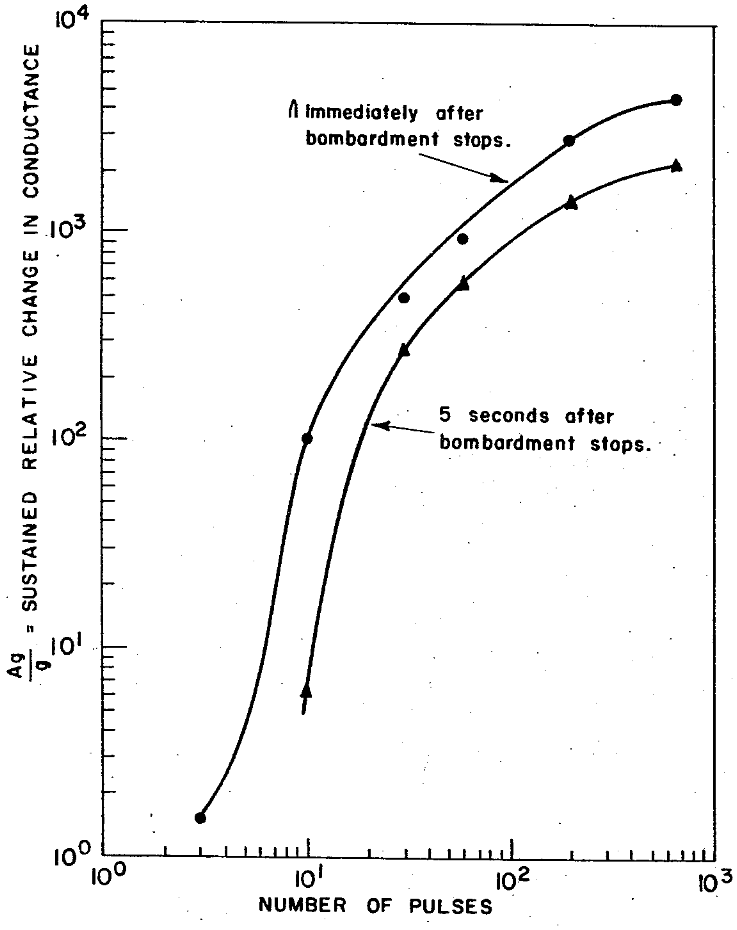
FIGURE 9 is a graph illustrating the relative sustained change in conductance versus the number of exciting pulses applied to a field sustained conductivity device according to the invention.

In FIGURE 9, the change in conductivity as a function of the number of exciting pulses is shown. Actually, the effect of the first few pulses is relatively negligible although this is not noticeable in the curves shown in FIGURE 9. With succeeding pulses, the sensitivity increases and there is some suggestion of saturation for a large number of pulses. For the curves shown in FIGURE 9, the electron beam energy was 14 kv., the beam current was 1 microamp, the pulse duration was 150 microseconds, the beam diameter was .25 cm., and the applied electric field was $3 \times 10^4$ volts/cm. on the ½ micron thick dielectric film. In addition, the barrier 10 was adjacent to the bottom electrode 4.

While the preceding data describes electron beam excitation, it has also been found possible to excite the field sustained conductivity structures with ultraviolet or visible light. The increased conductivity which the field sustained conductivity layer exhibits as a result of excitation may be maintained for many minutes or even for hours. Yet the dielectric layer may be restored to the low conductivity condition by a momentary reversal or removal of the applied electric field.

One of the important applications of the field sustained conductivity structures of the invention is in cathode ray tubes, particularly of the type capable of presenting a stored visual display. More specifically, such cathode ray tubes are known as direct-viewing storage tubes.

Heretofore, display storage devices have been provided which have utilized three different principles. Perhaps the earliest approach to providing a display storage device involved the use of long persistent phosphor materials for the viewing screen which would continue to luminesce after excitation had ceased. A second approach, which has had the greatest success, is a direct-viewing cathode ray tube utilizing a storage target on which an electrostatic charge pattern corresponding to the information to be displayed is formed by a scanning cathode ray beam. The storage target is continuously flooded with electrons from an additional electron source (called the "flood gun") and these flood electrons penetrate through the storage target in accordance with the electrostatic charge pattern thereon to impinge upon the viewing screen and excite this screen into luminescence. Typical of such direct-viewing storage display tubes are U.S. Patent 2,790,929 to E. E. Herman and G. F. Smith, in which the storage function is achieved by the phenomenon of secondary electron emission, and U.S. Patent 3,086,139 to N. H. Lehrer in which storage and/or selective erasure functions are achieved by electron bombardment induced conductivity and secondary electron emission phenomena.

Still a third type display storage device is one utilizing electroluminescent display panels in which a visual display is produced by establishing an electric field pattern, corresponding to the information to be displayed, across a layer of electroluminescent material. It has also been proposed to estabilsh the requisite electric field pattern by scanning a layer of bombardment induced conductivity material with an electron beam in a cathode ray tube and typical of such display tubes are U.S. Patents 3,087,085 and 3,087,086 to G. C. Turner.

These previous approaches to the problem of providing a display storage device all suffer from limitations as to either their storage or resolution capabilities or both.

Thus, for tubes utilizing long persistent phosphor targets, the persistence is not only fixed but information stored for any substantial fraction of a second decays to luminance levels in the millifoot-lambert region, hence requiring dark adaptation for viewing. In addition, these tubes usually employ settled phosphor materials and are therefore limited in resolution by the phosphor grain size. Direct-viewing storage tubes of the type utilizing a discrete storage target and flood electrons have the disadvantage of being severely limited in resolution by the mesh structure of the storage target while also requiring relatively complex circuitry. The electroluminescent phosphor storage devices suffer from the spreading of the stored image due to feedback of light from the excited phosphor material and where such spreading is overcome by complex structures, the devices are still handicapped by low resolution resulting from the presence of these very structures. In such tubes as described in the aforementioned patents to G. C. Turner, the electron bombardment induced conductivity effects are achieved by means of silica or barium titanate materials. Turner says nothing as to capability of his silica target arrangement to store electrical charges for any length of time. In U.S. Patent 3,087,086, it is stated that the image charges will remain stored on the target until the potentials across the capacitors leak away and in the case of barium titanate the time required is several hours. It is thus necessary, according to Turner, to discharge the entire charge storage pattern in order to erase a stored image and display new information.

Briefly, field sustained conductivity structures according to the invention may be utilized to advantage in a direct-viewing storage tube in which a layer of phosphor material capable of having its light output modulated by an applied field is disposed between a pair of electrode layers on the faceplate in a cathode ray tube. The purpose of the electrode layers is to permit the establishment of electrical fields across the phosphor layer in point-to-point fashion so as to modulate the luminescence of the phosphor layer which may be of the type known in the art as an electroluminescent phosphor in which case luminescence is not only modulated but is also produced by the applied fields. The electrode layer adjacent the tube's faceplate is optically transparent so that the light produced by the phosphor layer may be observed. The other electrode layer is a field sustained conductivity target structure according to the invention which is adapted to be scanned by an electron beam in order to establish the desired electrical fields across the phosphor layer in point-to-point fashion. It is also contemplated to provide means for limiting or inhibiting the light produced by the phosphor layer from feeding back to the field sustained conductivity target structure in instances where the photosensitivity of this structure is disadvantageous. It is thus possible to fabricate a direct-viewing storage tube with a relatively simple and meshless target structure which lends itself to relatively easy manufacture since various elements of the target may be provided by deposition techniques not requiring a supporting mesh or grid electrode.

Figures 10, 11:
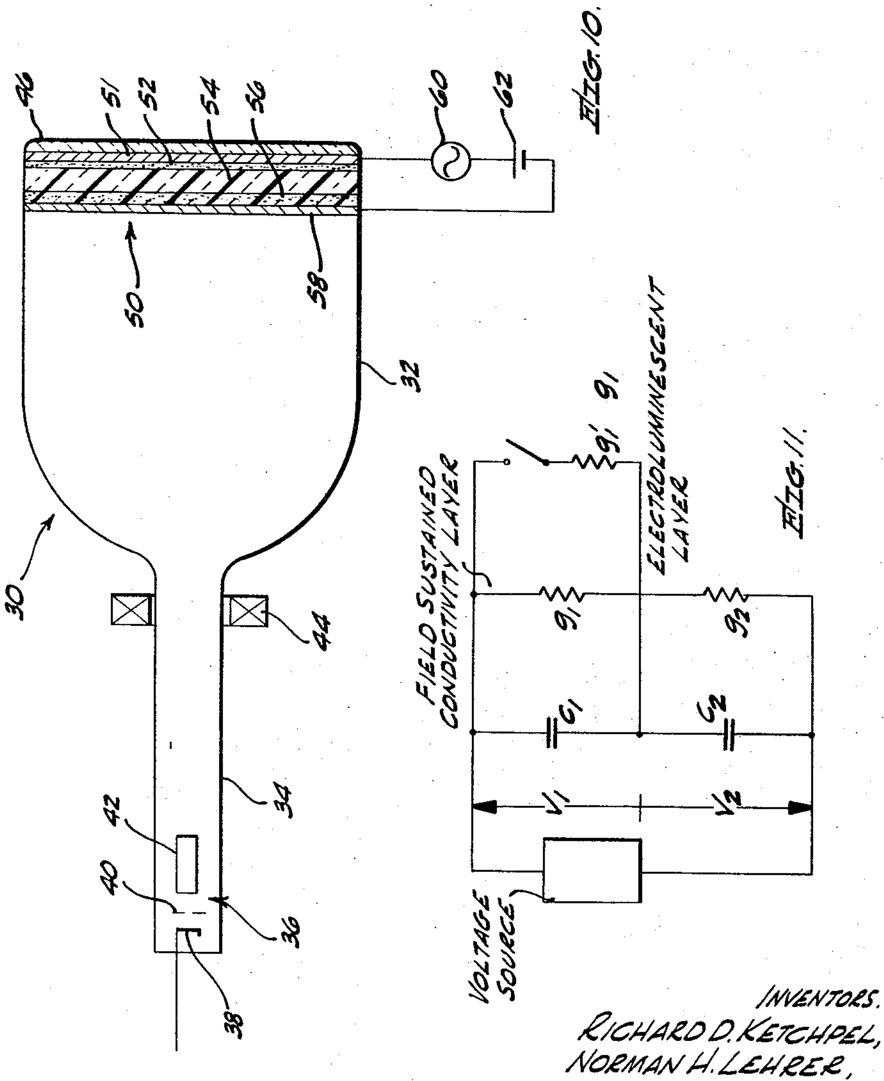
FIGURE 10 is an elevational view, partly in section and partly schematic, of a direct-viewing storage tube device embodying a field sustained conductivity element according to the invention.
FIGURE 11 is a schematic drawing illustrating an equivalent circuit analysis of the direct-viewing storage tube shown in FIGURE 10.

Referring now to FIGURE 10, a direct-viewing storage cathode ray tube is comprising an evacuated envelope 30 having a large bulbous portion 32 and a small diameter neck portion 34. An electron gun 36 is disposed in one end of the neck portion 34 and includes a cathode 38, an intensity modulating grid 40, and a beam-forming section 42. Any conventional electron gun may be utilized in the tube of the present invention and further detailed description thereof is not deemed necessary herein. Disposed between the electron gun 36 and the bulbous portion 32 and around the neck portion 34 of the tube is an electromagnetic deflection yoke 44. It will be understood that the electron beam produced by the electron gun 36 is directed down the neck portion 34 of the tube and through the electromagnetic fields established by the deflection yoke 44 whereby the electron beam may be deflected vertically and horizontally with respect to the axis of the tube 30. While an electromagnetic deflection system has been shown, it is also possible to utilize an electrostatic deflection system in order to make the electron beam follow a predetermined path.

The end of the large bulb portion 32 which is opposite the neck section 34 is provided with an optically transparent faceplate portion 46 which corresponds to the substrate 8 in the structure of FIGURE 1. Disposed on the inner surface of the faceplate 46 is a target structure 50 comprising an optically transparent, electrically conductive electrode member 51 in the form of a thin film or layer of metal such as gold, for example, which corresponds to the bottom electrode 4 in the structure of FIGURE 1. Such transparent conductive electrodes are well known and may be formed of other materials than metals. Thus it is possible to utilize a thin film of tin oxide, commercially known as "NESA" glass, for this purpose. Disposed on the transparent electrode layer 51 is a layer 52 of phosphor material of the type capable of having its light output modulated or of luminescing when subjected to an electric field. A typically suitable phosphor material of the latter or electroluminescent type may be manganese or chlorine activated zinc or cadmium sulfide. A more detailed description of electroluminescent phosphors suitable for use in the tube of the present invention and their preparation is found in an article by W. A. Thornton in the Journal of Applied Physics (1959), vol. 30 at page 123.

A thin film or layer 54 of field sustained conductivity material is disposed over the electroluminescent phosphor layer 52. The field sustained conductivity layer 54 may be formed of cadmium sulfide having a barrier region 56 as described hereinbefore. An electron transparent electrode film or layer 58, which may be a thin film of vapor-deposited aluminum, for example, is superposed on the field sustained conductivity layer 54 and connections to external voltage sources 60 and 62 are made through the wall of the tube 30 so as to permit the establishment of a predetermined electric field across the field sustained conductivity layer 54 and barrier region 56 as well as across the electroluminescent phosphor layer 52.

In operation, when the electron beam from the electron gun 36, modulated in accordance with information representative signals, scans the target structure 50, the field sustained conductivity layer 54 becomes conductive in a point-to-point fashion to a degree dependent upon the modulation of the electron beam. The electric field is thereby increased across the electroluminescent layer 52 in a similar point-to-point fashion causing this phosphor layer to luminesce and produce a visual presentation corresponding to the information to be displayed. Because the conductivity of the layer 54 is sustained even after bombardment thereof by the scanning electron beam has ceased, the electroluminescent phosphor layer remains excited and continues to luminesce. Stored displays may be erased by depending upon the decay of conductivity in the field sustained conductivity layer 54, the time of which may range from seconds to minutes. It is also possible to restore the cadmium sulfide layer 54 to its pre-excited or prebombarded state at any time by momentarily reversing the electric field applied thereacross.

The operation of the direct-viewing storage tube of the invention can be described and understood in more detail by an analysis of its equivalent circuit as shown in FIGURE 11. The admittance of each layer (the field sustained conductivity and the electroluminescent layers) has a capacitive and a conductive component which are designated as $c_1$ and $g_1$ for the field sustained conductivity layer 54 and as $c_2$ and $g_2$ for the electroluminescent layer 52. The circuit equivalent of the field sustained conductivity effect is represented by the conductance ($g_1'$) in series with a switch both of which together parallel the conductance of the field sustained conductivity layer where $g_1'$ is much greater than $g_1$. The action of the electron beam is represented by the closing of the switch in the circuit causing $g_1'$ to bypass $g_1$, thus shorting out the field sustained conductivity layer. The sustained conductivity effect is represented by the switch remaining closed after electron bombardment ceases. Erasure is represented by reopening the switch. For field sustained conductivity materials, when the excited conductivity slowly decays back to its pre-excited value, $g_1'$ is a function of time.

The voltage switching action of the field sustained conductivity layer can be understood by considering that in the unexcited condition, the impedance of the field sustained conductivity layer 54 is substantially greater than the impedance of the electroluminescent layer 52. Under these conditions, most of the voltage drop occurs across the field sustained conductivity film 54 and the electroluminescent layer 52 is therefore dark. As a result of bombardment with the electron beam, the impedance of the field sustained conductivity layer is reduced which results in an increase in the voltage drop across the electroluminescent layer causing it to luminesce. Because the induced conductivity is proportional to the electron beam current, it is possible to switch the voltage to a varying extent making it possible to display varying shades of gray.

Figure 12:
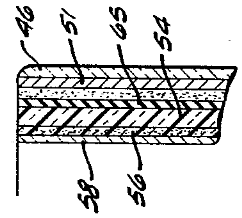
FIGURE 12 is a cross-sectional elevational view of a portion of an alternative target arrangement suitable for use in the direct-viewing storage tube shown in FIGURE 10.

In FIGURE 12 an embodiment of a storage target according to the invention is shown for use in a meshless storage tube wherein the target is provided with means to avoid any optical feedback between the field sustained conductivity layer 54 and the electroluminescent layer 52. Except for the opaque layer 65, which is also electrically insulating, disposed between the field sustained conductivity layer 54 and the electroluminescent layer 52, the target structure in FIGURE 12 and the operation thereof is identical to that shown in FIGURE 10 and as described in connection therewith. The opaque layer may comprise a thin film of chromium sulfide, for example, and effectively prevents photons produced by the electroluminescent layer 52 from "feeding back" or otherwise reaching the field sustained conductivity layer 54 and adversely affecting its conductivity.

What is claimed is:

1. An electrical field sustained conductivity device comprising: an electrically insulating substrate member, a first electrode member in the form of an electrically conductive layer disposed on said substrate member, a layer of cadmum sulfide disposed on said first electrode member, a second electrode member in the form of an electrically conductive layer disposed on said layer of cadmium sulfide, one of said electrode members being a layer of aluminum, and a barrier region in said layer of cadmium sulfide adjacent said one of said electrode members and formed by heating said layer of cadmium sulfide and said one of said electrode members at a temperature of from 200° to 400° C. for at least two hours in a sulfur-containing atmosphere.

2. The invention according to claim 1 wherein said barrier region is formed by heating said layer of cadmium sulfide and said one of said electrode members at a temperature of about 300° C. for about two hours.

3. The invention according to claim 1 wherein said sulfur-containing atmosphere is selected from the group consisting essentially of hydrogen sulfide and sulfur dioxide.

4. An electrical field sustained conductivity device comprising: an electrically insulating substrate member, an aluminum electrode member in the form of a layer disposed on said substrate member, a layer of cadmium sulfide disposed on said aluminum electrode member, a second electrode member in the form of an electrically conductive layer disposed on said layer of cadmium sulfide, and a barrier region in said layer of cadmium sulfide adjacent said aluminum electrode member and formed by heating said layer of cadmium sulfide and said aluminum electrode member to a temperature of from 200° to 400° C. for at least two hours in a sulfur-containing atmosphere.

5. The invention according to claim 4 wherein said second electrode member is in the form of a layer of electrically conductive material selected from the group consisting of aluminum, platinum, tin oxide, gold, indium, palladium, and rhodium.

6. The invention according to claim 4 wherein said barrier region is formed by heating said layer of cadmium sulfide and said aluminum electrode member at a temperature of about 300° C. for at least two hours.

7. An electrical field sustained conductivity device comprising: an electrically insulating substrate member, an aluminum electrode member in the form of a layer disposed on said substrate member, a layer of cadmium sulfide disposed on said aluminum electrode member, a second electrode member in the form of a layer of material selected from the group consisting of aluminum, platinum, tin oxide, gold, indium, palladium, and rhodium disposed on said layer of cadmium sulfide, and a barrier region in said layer of cadmium sulfide adjacent said aluminum electrode member and formed by heating said layer of cadmium sulfide and said aluminum electrode member at a temperature of about 300° C. for at least two hours in a sulfur-containing atmosphere.

8. An electrical field sustained conductivity device comprising: an electrically insulating substrate member, a first electrode member in the form of an electrically conductive layer disposed on said substrate member, a layer of cadmium sulfide disposed on said first electrode member, an aluminum electrode member disposed on said layer of cadmium sulfide, and a barrier region in said layer of cadmium sulfide adjacent said aluminum electrode member and formed by heating said layer of cadmium sulfide and said aluminum electrode member to a temperature of from 200°–400° C. for at least two hours in a sulfur-containing atmosphere.

9. The invention according to claim 8 wherein said first electrode member is in the form of a layer of electrically conductive material selected from the group consisting of platinum, tin oxide, gold, palladium, and rhodium.

10. The invention according to claim 8 wherein said barrier region is formed by heating said layer of cadmium sulfide and said aluminum electrode member at a temperature of about 300° C. for at least two hours.

11. An electrical field sustained conductivity device comprising: an electrically insulating substrate member, a first electrode member in the form of a layer of material selected from the group consisting of platinum, tin oxide, gold, palladium, and rhodium disposed on said substrate member, a layer of cadmium sulfide disposed on said first electrode member, an aluminum electrode member in the form of a layer disposed on said layer of cadmium sulfide, and a barrier region in said layer of cadmium sulfide adjacent said aluminum electrode member and formed by heating said layer of cadmium sulfide and said aluminum electrode member at a temperature of about 300° C. for at least two hours in a sulfur-containing atmosphere.

12. A direct-viewing electronic storage display device comprising:

(a) an evacuated container;

(b) a viewing screen disposed in said container and a phosphor layer capable of having its luminescence modulated in response to an electrical field established thereacross;

(c) an optically transparent, electrically conductive layer disposed on one side of said phosphor layer;

(d) a storage target disposed on the other side of said phosphor layer for establishing said electrical field thereacross in cooperation with said optically transparent conductive layer, said storage target including:

(1) a layer of cadmium sulfide disposed on said phosphor layer;

(2) an aluminum electrode member in the form of a layer disposed on said layer of cadmium sulfide;

(3) a barrier region in said layer of cadmium sulfide adjacent said aluminum electrode member and formed by heating said layer or cadmium sulfide and said aluminum electrode member at a temperature of from 200° to 400° C. for at least two hours in a sulfur-containing atmosphere;

(e) and an electron gun disposed in said container for forming an electron beam of elemental cross-sectional area and adapted to scan said storage target.

13. The invention according to claim 12 wherein said barrier region is formed by heating said layer of cadmium sulfide and said aluminum electrode member at a temperature of about 300° C. for about two hours in an atmosphere selected from the group consisting essentially of hydrogen sulfide and sulfur dioxide.

14. A direct-viewing electronic storage display device comprising:

(a) an evacuated container;

(b) a viewing screen disposed in said container and including an electroluminescent phosphor layer capable of having its luminescence modulated in response to an electrical field established thereacross;

(c) an optically transparent, electrically conductive layer disposed on one side of said phosphor layer;

(d) a storage target disposed on the other side of said phosphor layer for establishing said electrical field thereacross in cooperation with said optically transparent conductive layer, said storage target including:

(1) a layer of cadmium sulfide disposed on said phosphor layer;

(2) an aluminum electrode member in the form of a layer disposed on said layer of cadmium sulfide;

(3) a barrier region in said layer of cadmium sulfide adjacent said aluminum electrode member and formed by heating said layer of cadmium sulfide and said aluminum electrode member at a temperature of about 300° C. for about two hours in an atmosphere selected from the group consisting essentially of hydrogen sulfide and sulfur dioxide;

(e) and an electron gun disposed in said container for forming an electron beam of elemental cross-sectional area and adapted to scan said storage target.

15. A direct-viewing electronic storage display device comprising:

(a) an evacuated container;

(b) a viewing screen disposed in said container and including a phosphor layer capable of having its luminescence modulated in response to an electrical field established thereacross;

(c) an optically transparent, electrically conductive layer disposed on one side of said phosphor layer;

(d) an optically opaque, electrically insulating layer disposed on the other side of said phosphor layer;

(e) a storage target disposed on said optically opaque layer for establishing said electrical field across said phosphor layer in cooperation with said optically transparent conductive layer, said storage target including:

(1) a layer of cadmium sulfide disposed on said opaque layer;

(2) an aluminum electrode member in the form of a layer disposed on said layer of cadmium sulfide;

(3) a barrier region in said layer of cadmium sulfide adjacent said aluminum electrode member and formed by heating said layer of cadmium sulfide and said aluminum electrode member at a temperature of from 200° to 400° C. for at least two hours in a sulfur-containing atmosphere.

(f) and an electron gun disposed in said container for forming an electron beam of elemental cross-sectional area and adapted to scan said storage target.

16. The invention according to claim 15 wherein said optically opaque, electrically insulating layer is formed of chromium sulfide.

17. The invention according to claim 15 wherein said optically opaque, electrically insulating layer is formed of chromium sulfide and said sulfur-containing atmosphere is selected from the group consisting essentially of hydrogen sulfide and sulfur dioxide.

18. A direct-viewing electronic storage display device comprising:

(a) an evacuated container;

(b) a viewing screen disposed in said container and including an electroluminescent phosphor layer adapted to luminesce in response to an electrical field established thereacross;

(c) an optically transparent, electrically conductive layer disposed on one side of said phosphor layer;

(d) an optically opaque, electrically insulating layer of chromium sulfide disposed on the other side of said phosphor layer;

(e) a storage target disposed on said optically opaque layer for establishing said electrical field across said phosphor layer in cooperation with said optically transparent conductive layer, said storage target including:

(1) a layer of cadmium sulfide disposed on said opaque layer;

(2) an aluminum electrode member in the form af a layer disposed on said layer of cadmium sulfide;

(3) a barrier region in said layer of cadmium sulfide adjacent said aluminum electrode member and formed by heating said layer of cadmium sulfide and said aluminum electrode member at a temperature of from 200° to 400° C. for at least two hours in a sulfur-containing atmosphere;

(f) and an electron gun disposed in said container for forming an electron beam of elemental cross-sectional area and adapted to scan said storage target.

References Cited

UNITED STATES PATENTS

| | | | |
|---|---|---|---|
| 2,835,822 | 5/1958 | Williams | 250—80 |
| 2,885,560 | 5/1959 | Destrian | 250—71 |
| 2,967,262 | 1/1961 | Madey | 315—12 |
| 2,967,971 | 1/1961 | Beintema | 315—12 |
| 3,043,987 | 7/1962 | Michlin | 315—26 |
| 3,162,556 | 12/1964 | Ravich | 148—174 |

JOHN W. HUCKERT, *Primary Examiner.*

M. EDLOW, *Assistant Examiner.*

UNITED STATES PATENT OFFICE

CERTIFICATE OF CORRECTION

Patent No. 3,344,300 September 26, 1967

Norman H. Lehrer et al.

It is hereby certified that error appears in the above numbered patent requiring correction and that the said Letters Patent should read as corrected below.

Column 2, line 48, for "lent" read -- lend --; column 8, line 70, for "mesurements" read -- measurements --; column 12, line 45, for "cadmum" read -- cadmium --; column 13, line 61, after "and" insert -- including --.

Signed and sealed this 26th day of November 1968.

(SEAL)
Attest:

Edward M. Fletcher, Jr.
Attesting Officer

EDWARD J. BRENNER
Commissioner of Patents